Patented Dec. 28, 1948

2,457,331

UNITED STATES PATENT OFFICE 2,457,331

VULCANIZATION OF ISOBUTYLENE RUBBER

Joseph H. Trepagnier, Wilmington, Del., assignor to E. I. du Pont de Nemours & Company, Wilmington, Del., a corporation of Delaware No Drawing. Application October 8, 1945, Serial No. 621,169

7 Claims. (Cl. 260—79)

This invention relates to an improvement in the process for vulcanizing isobutylene rubber, which is commonly called in the trade "butyl rubber." The invention relates more particularly to a process wherein the vulcanization of the isobutylene rubber is carried out in the presence of N-nitroso-p-nitroso-anilines.

In Ind. & Eng. Chem. 34, page 1301 (1942), Haworth & Baldwin point out that the term "butyl rubber" is a generic name applied to a variety of vulcanizable elastic copolymers of isobutylene and small amounts of diolefines. The diolefines are usually chosen to give a final product which has only a small percentage of the unsaturation of natural rubber. In the present specification, the term "isobutylene rubber" is employed to designate that class of rubbers referred to by Haworth & Baldwin as "butyl rubber." The present invention is applicable to the isobutylene rubbers generically, and more particularly to those isobutylene rubbers made from isobutylene and small amounts of diolefines, which copolymers have a range of unsaturation of from 0.1% to 10% of the unsaturation of natural rubber.

Isobutylene rubber is unique among the commercial synthetic elastomers because of the small amount of chemical unsaturation that it contains. This limited amount of unsaturation leads to the production of vulcanizates which are marked by excellent chemical stability and which, on this account, have numerous important potential uses. This low unsaturation, however, as well as being an advantage, is also a disadvantage in that it makes isobutylene rubber difficult to vulcanize. When vulcanized in the usual manner, using sulfur as the vulcanizing agent and a thiuram accelerator, isobutylene rubber cures quite slowly even at high temperatures, and gives only low modulus vulcanizates. A large number of known accelerators for the vulcanization of rubber have been tested as accelerators for isobutylene rubber vulcanization, but only a few of the most active, particularly members of the thiuram and dithiocarbamate classes, have been found effective. Vulcanizates produced by the use of even the best of these accelerators, together with sulfur, are characterized by low elongations, high compression set, poor resilience at room temperature, and considerable hot flow. These characteristics limit the field of usefulness of isobutylene rubber to a considerable extent.

It is therefore an object of this invention to provide an improved method for vulcanizing isobutylene rubber by which it can be vulcanized more rapidly than has been possible heretofore, and which will provide isobutylene rubber vulcanizates with improved physical properties.

I have found that the vulcanization of isobutylene rubbers can be materially accelerated, and that the isobutylene rubber vulcanizates obtained exhibit improved physical properties, when the vulcanization of the isobutylene rubber is carried out in combination with suitable organic accelerators and an N-nitroso-p-nitrosoaniline.

I have found that N-nitroso-p-nitrosoanilines operate as powerful activators for sulfur-accelerator cures of isobutylene rubber, and enable the preparation of vulcanizates which have a considerably faster rate of cure without producing scorchiness, and which lead to the production of vulcanizates which have much higher moduli, good tensile strengths, less compression set, lower heat build-up, improved resilience and improved properties at elevated temperatures.

The following examples are given to illustrate the invention, together with comparisons of the results obtained in the vulcanization of similar stocks wherein the improvement of this invention has not been employed. Unless otherwise specified, the parts used are by weight.

The following stocks were prepared containing the ultra-accelerator most commonly used for the vulcanization of isobutylene rubber. GR-I, which is one type of isobutylene rubber, was used in these stocks. This sample contained 0.5% of phenyl-beta-naphthylamine and 1% of zinc stearate when received from the manufacturer.

|  | Stock A | Stock B | Stock C | Stock D |
|---|---|---|---|---|
| GR-I (isobutylene rubber) | 100 | 100 | 100 | 100 |
| Reinforcing Furnace Black | 50 | 50 | 50 | 50 |
| Zinc Oxide | 5 | 5 | 5 | 5 |
| Stearic Acid | 3 | 3 | 3 | 3 |
| Sulfur | 2 | 4 | 2 | 2 |
| Tetramethyl Thiuram Disulfide | 1 | 1 | 2 | 1 |
| Diphenylguanidine |  |  |  | 1 |

Portions of these stocks were cured for 30 minutes at 307° F. in the form of small rings and tested with the Williams tension testing machine. The results appear in Table I.

TABLE I

|  | Stock A | Stock B | Stock C | Stock D |
|---|---|---|---|---|
| Modulus at 300% Elongation, Lbs./Sq. In. | 400 | 425 | 425 | 225 |
| Tensile at Break, Lbs./Sq. In. | 2,025 | 1,850 | 1,850 | 1,775 |

It can be seen from these tests that doubling the amount of sulfur or accelerators makes very little difference in the cure. Adding a basic accelerator actually has a deleterious effect.

I have now found that the rate of vulcanization of an isobutylene rubber can be markedly increased by using a small amount of a N-nitroso-p-nitrosoaniline in combination with the accelerator. Furthermore, the vulcanizates so obtained have higher moduli and are superior in many other physical properties to those obtained with the accelerator alone.

To demonstrate the improvement in rate of vulcanization and increase in modulus obtained by using a N-nitroso-p-nitrosoaniline, the following stocks were prepared.

|  | Stock A | Stock E | Stock F | Stock G |
|---|---|---|---|---|
| GR-I (isobutylene rubber) | 100 | 100 | 100 | 100 |
| Reinforcing Furnace Black | 50 | 50 | 50 | 50 |
| Zinc Oxide | 5 | 5 | 5 | 5 |
| Stearic Acid | 3 | 3 | 3 | 3 |
| Sulfur | 2 | 2 | 2 | 2 |
| Tetramethyl Thiuram Disulfide | 1 | 1 | 1 | 1 |
| N-Nitroso-N-Methyl-p-Nitrosoaniline |  | .3 | .5 | 1 |

These stocks were vulcanized and tested as before. The results obtained are shown in Table II.

TABLE II

| Mins. Cured | Temp. of Cure, °F. | Modulus at 300% Elongation, Lbs./Sq. In. | | | |
|---|---|---|---|---|---|
|  |  | Stock A | Stock E | Stock F | Stock G |
| 15 | 307 | 225 | 350 | 475 | 550 |
| 45 | 307 | 475 | 875 | 900 | 975 |
|  |  | Tensile at Break, Lbs./Sq. In. | | | |
| 15 | 307 | 1,575 | 1,925 | 1,900 | 1,850 |
| 45 | 307 | 1,800 | 2,425 | 2,225 | 2,350 |

These tests show that relatively small amounts of N-nitroso-N-methyl-p-nitrosoaniline markedly activate the cure, increasing the rate of cure considerably and producing vulcanizates with higher moduli and higher tensile strengths.

Even more pronounced effects are obtained when isobutylene rubber stocks containing no stearic acid are accelerated with a mixture of an accelerator and a N-nitroso-p-nitrosoaniline. The data of Table III illustrate this effect. These results were obtained with the stocks listed below, the tests being made on dumbell strips with a Scott testing machine. Stock H, which is similar to those which have been recommended [See Industrial and Engineering Chemistry 34, page 1302 (1492)] for isobutylene rubber, is included for comparison.

|  | Stock | | | | |
|---|---|---|---|---|---|
|  | H | I | J | K | L |
| GR-I (isobutylene rubber) | 100 | 100 | 100 | 100 | 100 |
| Reinforcing Furnace Black | 50 | 50 | 50 | 50 | 50 |
| Zinc Oxide | 5 | 5 | 5 | 5 | 5 |
| Sulfur | 2 | 2 | 2 | 2 | 2 |
| Paraffin |  | 1 | 1 | 1 | 1 |
| Stearic Acid | 1 |  |  |  |  |
| Tetramethyl Thiuram Disulfide | 1 | 1 | 1 | 1 | 1 |
| Mercaptobenzothiazole | 1 |  |  |  |  |
| N-Nitroso-N-Methyl-p-Nitrosoaniline |  |  | 0.075 | 0.15 | 0.3 |

TABLE III

| Mins. Cured | Temp. of Cure, °F. | Modulus at 300% Elongation, Lbs./Sq. In. | | | | |
|---|---|---|---|---|---|---|
|  |  | Stock H | Stock I | Stock J | Stock K | Stock L |
| 60 | 227 | (1) | (1) | (1) | (1) | (1) |
| 30 | 307 | 625 | 525 | 725 | 750 | 875 |
| 60 | 307 | 750 | 700 | 925 | 975 | 975 |
|  |  | Tensile at Break, Lbs./Sq. In. | | | | |
| 60 | 227 | (1) | (1) | (1) | (1) | (1) |
| 30 | 307 | 2,450 | 2,575 | 2,725 | 2,750 | 2,725 |
| 60 | 307 | 2,200 | 2,400 | 2,550 | 2,650 | 2,550 |

[1] No cure.

The results in Table III clearly demonstrate the remarkable increase in rate of vulcanization obtained by using only very small amounts of a N-nitroso-p-nitrosoaniline. For example, stock L, which contains 0.3 part of N-nitroso-N-methyl-p-nitrosoaniline, cures more than twice as fast as stock H or I, as shown by the 30 minute cure of the former stock having a higher modulus than the 60 minute cure of the other two. The fact that such an increase in modulus can be obtained with as little as 0.3 part of N-nitroso-N-methyl-p-nitrosoaniline is indeed remarkable and surprising when one considers the data of Table I.

In addition to improving the rate of cure and increasing the modulus of the vulcanizates, the use of N-nitroso-p-nitrosoanilines improves other physical properties of the vulcanizates such as compression set, resilience and heat build-up.

The improvement in compression set of stocks containing a N-nitroso-p-nitrosoaniline over a stock such as H, is shown in Table IV—A. These measurements were made by the A. S. T. M. procedure, Method B (A. S. T. M. Standards for Rubber Products, D395–40T), except that the pellets were compressed for 48 hours at room temperature. The stocks were cured for 60 minutes at 307° F.

TABLE IV—A

|  | Stock H | Stock J | Stock K |
|---|---|---|---|
| Compression Set, per cent | 14.5 | 7.6 | 8.1 |

The improvement in heat build-up of Stock J over Stock H is illustrated in Table IV—B. The measurements were made by means of a Goodrich Flexometer, using a ⅛ inch stroke. The stocks were cured for 60 minutes at 307° F.

TABLE IV—B

*Heat build-up in degrees centigrade*

|  | Stock H | Stock J |
|---|---|---|
| 5 Minutes Flexing | 30 | 28 |
| 10 Minutes Flexing | 42 | 38 |
| 20 Minutes Flexing | 51 | 44 |

The improvement in resilience of a stock containing a N-nitroso-p-nitrosoaniline over a stack such as H, is shown in Table IV—C. The stocks were also cured for 60 minutes at 307° F.

TABLE IV—C

Yerzley resilience, per cent
Stock H _____ 46.6
Stock J _____ 56.2

Table V illustrates the activation obtained with other N-nitroso-p-nitrosoanilines. The results were obtained with the Williams tension testing machine on rings cured for 30 minutes at 307° F.

|  | Stock M | Stock N | Stock O |
|---|---|---|---|
| GR-I (isobutylene rubber) | 100 | 100 | 100 |
| Reinforcing Furnace Black | 50 | 50 | 50 |
| Zinc Oxide | 5 | 5 | 5 |
| Sulfur | 2 | 2 | 2 |
| Tetramethyl Thiuram Disulfide | 1 | 1 | 1 |
| N-Nitroso-N-Ethyl-p-Nitrosoaniline |  | 0.3 |  |
| N-Nitroso-N-butyl-p-Nitrosoaniline |  |  | 0.5 |

TABLE V

|  | Stock M | Stock N | Stock O |
|---|---|---|---|
| Modulus at 300% Elongation, Lbs./Sq. In. | 600 | 850 | 1,000 |
| Tensile at Break, Lbs./Sq. In. | 1,900 | 2,125 | 2,425 |

Many types of accelerators can be used in combination with these nitroso compounds. This is illustrated by the data in Table VI. The base stock used in these tests had the following composition:

BASE STOCK

| | Parts |
|---|---|
| GR-I (isobutylene rubber) | 100 |
| Reinforcing furnace black | 50 |
| Zinc oxide | 5 |
| Sulfur | 2 |

The accelerators shown the table (in parts by weight) were added to this base stock in each case prior to vulcanization, so that the parts of accelerator employed are based on 100 parts of the GR-I. The stocks were cured for 30 minutes at 307° F. in the form of small rings and tested with the Williams tension testing machine.

TABLE VI

| Acceleration Used with Base Stock | Parts | Modulus at 300% Elongation, Lbs. per Sq. In. | Tensile at Break, Lbs. per Sq. In. |
|---|---|---|---|
| Tetramethyl Thiuram Disulfide | 1 | 650 | 2,150 |
| Do | 1 | 1,000 | 2,350 |
| N-Nitroso-N-Methyl-p-Nitrosoaniline | 0.5 | | |
| Tetramethyl Thiuram Disulfide | 1 | 700 | 2,000 |
| Mercaptobenzothiazole | 0.5 | | |
| Tetramethyl Thiuram Disulfide | 1 | 1,075 | 2,525 |
| Mercaptobenzothiazole | 0.5 | | |
| N-Nitroso-N-Methyl-p-Nitrosoaniline | 0.5 | | |
| Dipentamethylene Thiuram Tetrasulfide | 1 | 475 | 2,000 |
| Do | 1 | 750 | 2,425 |
| N-Nitroso-N-Methyl-p-Nitrosoaniline | 0.5 | | |
| Ferric Dimethyl Dithiocarbamate | 1 | 575 | 1,950 |
| Do | 1 | 900 | 2,075 |
| N-Nitroso-N-Methyl-p-Nitrosoaniline | 0.5 | | |
| Selenium Diethyl Dithiocarbamate | 1 | 550 | 2,075 |
| Do | 1 | 675 | 2,100 |
| N-Nitroso-N-Methyl-p-Nitrosoaniline | 0.5 | | |
| 2,4-Dinitrophenyl Ester of Dimethyl Dithiocarbamic Acid | 1 | 200 | 1,125 |
| Do | 1 | 550 | 1,700 |
| N-Nitroso-N-Methyl-p-Nitrosoaniline | 0.5 | | |
| Mercaptobenzothiazole | 1 | 175 | 900 |
| Do | 1 | 400 | 1,300 |
| N-Nitroso-N-Methyl-p-Nitrosoaniline | 0.5 | | |
| Piperidinium Pentamethylene Dithiocarbamate | 1 | 350 | 1,900 |
| Do | 1 | 475 | 1,800 |
| N-Nitroso-N-Methyl-p-Nitrosoaniline | 0.5 | | |
| Lead Dibutyl Dithiocarbamate | 1 | 375 | 1,700 |
| Do | 1 | 625 | 2,000 |
| N-Nitroso-N-Methyl-p-Nitrosoaniline | 0.5 | | |
| Tetramethyl Thiuram Mono-sulfide | 1 | 625 | 2,000 |
| Do | 1 | 900 | 2,450 |
| N-Nitroso-N-Methyl-p-Nitrosoaniline | 0.5 | | |

These data show that a wide variety of accelerators are effective, although certain ones such as tetramethyl thiuram disulfide are outstanding in producing high moduli and tensiles. In general, any accelerator which can be used to vulcanize isobutylene rubber can be used more effectively in combination with a N-nitroso-p-nitrosoaniline. The preferred class of accelerators with which the N-nitroso-p-nitrosoanilines are employed are the thiuram sulfides, including the di- and poly-sulfides, and the dithiocarbamates including their metal salts and amine salts. Other accelerators, which are known to accelerate the vulcanization of isobutylene rubber, may be employed. An isobutylene rubber accelerator will be defined as an organic compound which will produce a vulcanizate having at least a 750 lb./sq. in. tensile strength when 2 parts are compounded in the base stock above and vulcanized at 307° F. for 30 minutes.

Table VII shows that the use of N-nitroso-p-nitrosoanilines is also applicable to other isobutylene rubbers such as Butyl B 1.45. These results are also based on data obtained with a Williams tension testing machine on cures of 30 minutes at 307° F.

|  | Stock P | Stock Q |
|---|---|---|
| Butyl B 1.45 (isobutylene rubber) | 100 | 100 |
| Channel Black | 40 | 40 |
| Zinc Oxide | 5 | 5 |
| Sulfur | 1.5 | 1.5 |
| Tetramethyl Thiuram Disulfide | 1 | 1 |
| N-Nitroso-N-Methyl-p-Nitrosoaniline |  | 0.5 |

Table VII

|  | Stock P | Stock Q |
|---|---|---|
| Modulus at 300% Elongation Lbs./Sq. In. | 475 | 650 |
| Tensile at Break, Lbs./Sq. In. | 975 | 1,025 |

The N-nitroso-p-nitrosoanilines which may be employed in carrying out the process of this invention are those which have the general formula:

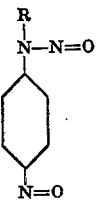

wherein R may be alkyl, cycloalkyl and aralkyl. Straight and branched chain alkyl groups containing up to and including six carbon atoms are suitable. The cycloalkyl derivatives are preferably those which contain only one ring such as cyclohexyl. In the aralkyl groups, the alkyl chain is preferably not more than 3 carbon atoms in length, and the aryl group attached is of the benzene series. The simpler derivatives of this class include such compounds as N-nitroso-N-isopropyl-p-nitrosoaniline, N-nitroso-N-(n-hexyl)-p-nitrosoaniline, N-nitroso-N-cyclohexyl-p-nitrosoaniline, N-nitroso-N-benzyl-p-nitrosoaniline. The N-nitroso-p-nitrosoanilines employed in this invention may be made as described by Fisher and Hepp, Berichte 19, 2992 (1886).

The amount of the nitroso compound used in carrying out this invention may be varied over a wide range, and will depend upon properties desired in the resulting vulcanizate. Improvement in the vulcanization has been obtained when from 0.01 to 3 parts of the nitroso compound per 100 parts of isobutylene rubber are employed, although the preferred range is from 0.05 to 2 parts of the nitroso compound per 100 parts of elastomer.

The amount of vulcanization accelerator employed will of course depend upon the activity of the particular accelerator. In general, the amounts will lie between 0.05 and 4 parts of accelerator for 100 parts of the isobutylene rubber, although amounts outside of this range may be employed where the accelerator is one having greater or less activity. In general, the amount of accelerator employed will range from 0.2 to 2 parts per 100 parts of isobutylene rubber.

The sulfur employed in effecting vulcanization may be used either in the form of elemental sulfur or as a sulfur-yielding compound. In some instances, such as when di-pentamethylene-thiuram-tetrasulfide is used, the one compound serves simultaneously as accelerator and as a source of sulfur. The amount of sulfur is not critical, and will depend to a large extent upon the type and activity of the accelerator employed in the mix. Certain active types of accelerator will require only relatively small amounts of sulfur, while other less active accelerators will require larger amounts of sulfur. The presence of a large excess of sulfur is not harmful, while in most cases 0.05 part of sulfur per 100 parts of elastomer will be found to be the lowest practical limit. The invention resides not in the use of particular amounts of sulfur or accelerator, but more particularly to the use of the combination of the N-nitroso-p-nitrosoaniline with sulfur and vulcanization accelerator, and the proportions will vary, depending upon the circumstances such as the type of cure desired and the type of accelerator employed, and upon the particular isobutylene rubber being worked.

The use of metal oxides in this process is advantageous, and leads to improved physical properties of the vulcanizates. Although the amount to be employed is not critical, the process is carried out preferably in the presence of at least 0.5 part of a metal oxide per 100 parts of elastomer. The invention, however, is not limited in the use of any metal oxide. The process can be carried out in the presence of such materials as zinc stearate or other additives normally used in the vulcanization of this type of rubber.

Although most of the tests given in the above examples were carried out on stocks containing a high loading of carbon black, other amounts and other types of reinforcing agents, fillers and extenders can be used. This method of vulcanization is also applicable to stocks which contain softeners, elasticators (material which produces an unusual degree of resilience in the isobutylene rubber), and other compounding ingredients which are consistent with good isobutylene rubber compounding practice.

In this specification, the isobutylene rubber designated as "GR-I" is an isobutylene rubber produced in government plants, and which is being perfected for military and civil needs. For further information concerning these isobutylene rubbers, reference may also be made to Ind. Eng. Chem. 32, 1283 (1940).

I claim:

1. In the process of vulcanizing isobutylene rubbers which are copolymers of isobutylene and small amounts of a diolefine, which copolymers have a range of unsaturation of from 0.1% to 10% of the unsaturation of natural rubber, the step which comprises incorporating into the vulcanizable isobutylene rubber mix containing sulfur and a vulcanization accelerator of the group consisting of thiuram sulfides and dithiocarbamates, from 0.01 to 3 parts, per 100 parts of isobutylene rubber, of an N-nitroso-p-nitrosoaniline of the formula:

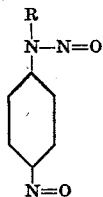

wherein R stands for a hydrocarbon radical of the class consisting of an alkyl group containing not more than 6 carbon atoms, a mono-cycloalkyl group containing not more than 6 carbon atoms and an aralkyl group in which the alkyl chain contains not more than 3 carbon atoms and the aryl group is of the benzene series.

2. In the process of vulcanizing isobutylene rubbers which are copolymers of isobutylene and small amounts of a diolefine, which copolymers have a range of unsaturation of from 0.1% to 10% of the unsaturation of natural rubber, the step which comprises incorporating into the vulcanizable isobutylene rubber mix containing sulfur and a dithiocarbamate vulcanization accelerator, from 0.01 to 3 parts, per 100 parts of isobutylene rubber, of an N-nitroso-p-nitrosoaniline of the formula:

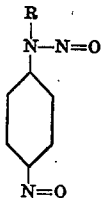

wherein R stands for a hydrocarbon radical of the class consisting of an alkyl group containing not more than 6 carbon atoms, a mono-cycloalkyl group containing not more than 6 carbon atoms and an aralkyl group in which the alkyl chain contains not more than 3 carbon atoms and the aryl group is of the benzene series.

3. In the process of vulcanizing isobutylene rubbers which are copolymers of isobutylene and small amounts of a diolefine, which copolymers have a range of unsaturation of from 0.1% to 10% of the unsaturation of natural rubber, the step which comprises incorporating into the vulcanizable isobutylene rubber mix containing sulfur and a thiuram sulfide vulcanization accelerator, from 0.01 to 3 parts, per 100 parts of isobutylene rubber, of an N-nitroso-p-nitrosoaniline of the formula:

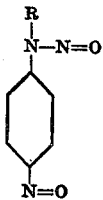

wherein R stands for a hydrocarbon radical of the class consisting of an alkyl group containing not more than 6 carbon atoms, a mono-cycloalkyl group containing not more than 6 carbon atoms and an aralkyl group in which the alkyl chain contains not more than 3 carbon atoms and the aryl group is of the benzene series.

4. In the process of vulcanizing isobutylene rubbers which are copolymers of isobutylene and small amounts of a diolefine, which copolymers have a range of unsaturation of from 0.1% to 10% of the unsaturation of natural rubber, the step which comprises incorporating into the vulcanizable isobutylene rubber mix containing sulfur and a thiuram disulfide vulcanization accelerator, from 0.01 to 3 parts, per 100 parts of isobutylene rubber, of N-nitroso-N-methyl-p-nitrosoaniline.

5. In the process of vulcanizing isobutylene rubbers which are copolymers of isobutylene and small amounts of a diolefine, which copolymers have a range of unsaturation of from 0.1% to 10% of the unsaturation of natural rubber, the step which comprises incorporating into the vulcanizable isobutylene rubber mix containing sulfur and tetramethyl thiuram disulfide accelerator, from 0.01 to 3 parts, per 100 parts of isobutylene rubber, of N-nitroso-N-methyl-p-nitrosoaniline.

6. A vulcanizable isobutylene rubber obtained by the process of claim 1.

7. A vulcanizable isobutylene rubber obtained by the process of claim 4.

JOSEPH H. TREPAGNIER.

REFERENCES CITED

The following references are of record in the file of this patent:

UNITED STATES PATENTS

| Number | Name | Date |
|---|---|---|
| 2,258,268 | Sparks et al. | Oct. 7, 1941 |

OTHER REFERENCES

Hackh's Chemical Dictionary, 3rd edition, page 108.